Feb. 2, 1971  C. H. GRAHAM  3,560,027
COUPLING ASSEMBLY
Original Filed Dec. 23, 1965
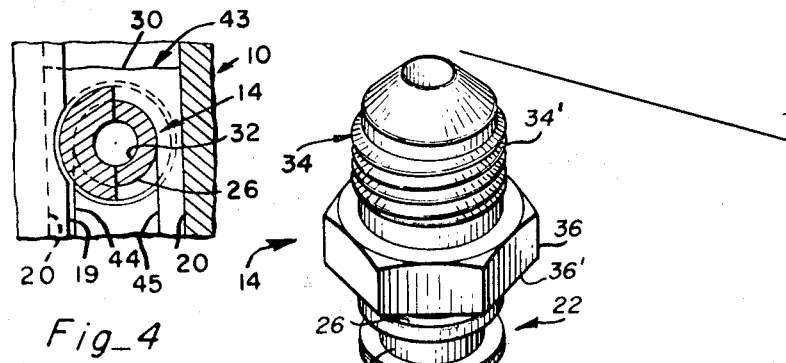
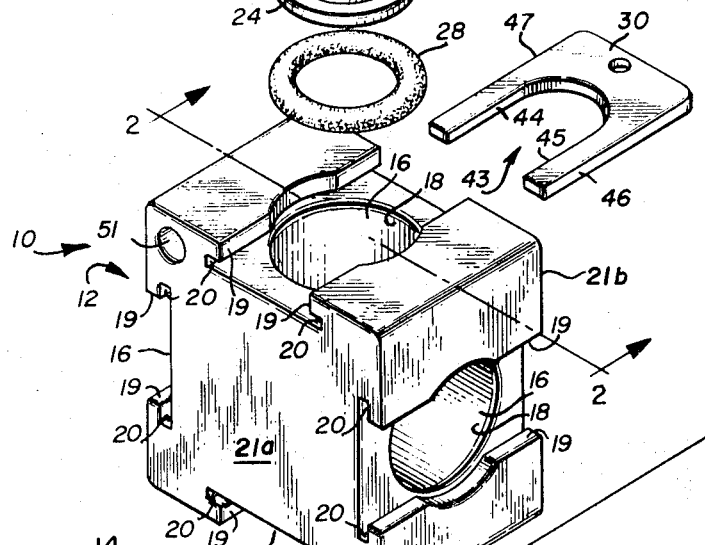
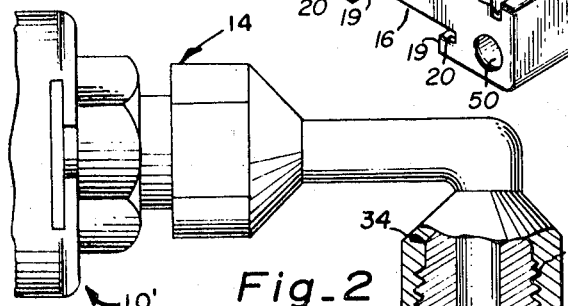
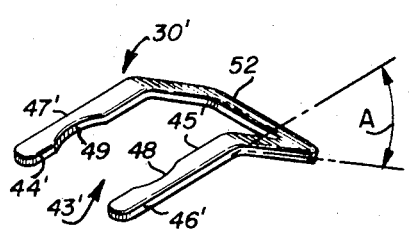
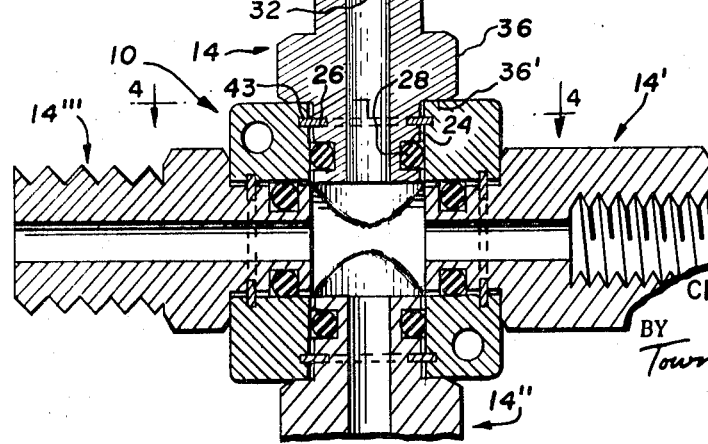
INVENTOR.
CHARLES H. GRAHAM
BY
*Townsend and Townsend*
ATTORNEYS

United States Patent Office 3,560,027
Patented Feb. 2, 1971

3,560,027
COUPLING ASSEMBLY
Charles H. Graham, Mountain View, Calif., assignor to Gra-Tec, Inc., Los Altos, Calif., a corporation of California
Continuation of application Ser. No. 515,848, Dec. 23, 1965, which is a continuation-in-part of application Ser. No. 432,598, Feb. 15, 1965. This application Feb. 20, 1967, Ser. No. 617,145
Int. Cl. F16l 41/00
U.S. Cl. 285—150                                    8 Claims

ABSTRACT OF THE DISCLOSURE

The coupling assembly disclosed herein comprises a distribution block and associated fitting terminations sealably connected with the block. The distribution block is provided with a plurality of intersecting smooth bores extending thereinto from the sides thereof to provide a plurality of ports and a corresponding number of slots, each intersecting one of the bores adjacent a port. Each of the fitting terminations includes a cylindrical surface portion having a pair of axially spaced annular grooves and slidably received within the associated bore, and a shoulder portion abutting a block side surface when the termination is positioned within the bore with the outer annular groove aligned with an associated slot. A clip slides within the slot and a portion of that outer groove and a resilient O-ring is positioned within the other groove, respectively, to lock and seal the block and termination together.

---

This application is a continuation of copending application Ser. No. 515,848, filed on Dec. 23, 1965, now abandoned, which was a continuation-in-part of application Ser. No. 432,598, filed Feb. 15, 1965, now abandoned.

The invention relates in general to a coupling assembly and, more particularly, to a fluid coupling assembly which can easily be made up in any one of a multitude of possible fitting configurations, sizes and mating characteristics by selection of certain parts as desired.

Conduit systems such as hydraulic and pneumatic distribution systems typically require coupling assemblies of many different configurations between conduit runs. Depending upon the desired distribution and routing, typical conduit systems utilize many crosses, L's, T's, Y's and reducers. In cases of fluid distribution systems where a coupling assembly receives fluid from one source and distributes it to several distribution lines, different sizes are often utilized for the different arms of the coupling element. Furthermore, depending upon the manner in which a conduit fits into a system and is to be removed from the system, male and female couplings are required in different places on the coupling assemblies. Still further, if a system of coupling assemblies is to be universally applicable, the coupling elements must include coupling members of many different types such as, for example, metric sizes, conventional threaded members with threads of different pitch, tubulation connectors for flared tubing using one pitch, tubulation connectors for flared tubing using one or a variety of flared angles such as 37° or 45°, and hose connections.

The coupling systems presently utilized to meet the needs of as many conduit systems as possible include a line of coupling members provided with male and sometimes female threaded portions for cooperating with threaded connections on the conduits. In order to provide a reasonably complete line of sizes and configurations of coupling assemblies, it is the present practice to stock a number of coupling assemblies in a vast number of different sizes and configurations. The use of such a system requires an extensive inventory and considerable time spent in both stocking the inventory and locating from the inventory the desired coupling assembly to fit particular needs. In many cases this system simply cannot provide a coupling assembly for a particular need.

Coupling assemblies utilizing threaded members have been known for a long time. However, any assembly that requires the threading together of two or more members has a number of problems. First of all, there is the possibility that when the two members are brought together the respective threads can be crossed which will sufficiently damage one or both of the members so that they cannot be utilized. This can involve considerable expense when the remaining portion of the member in which the threads are found is an expensive item. Also, the fact that relative rotation is necessary means that sufficient clearance is required adjacent at least one of the members to permit rotation of that member with respect to the other member and in the usual circumstances additional operating room is necessary for the tool which is used to produce the rotational force to make the connection. Furthermore, in many cases a coupling between male and female members having mating metal threads requires an additional sealant because the metal contact does not produce a seal against the fluid being carried within the system.

A variety of structures have been proposed in the past for producing a quick disconnect junction between two conduits and utilizing sliding sealing contact between the two members. In spite of the fact that such sliding contact connections have been known for some time, no one to my knowledge has conceived of a universal coupling assembly system whereby a coupling assembly of a desired configuration can be quickly and efficiently produced from standard distribution blocks and a multitude of fitting terminations.

The object of the present invention is to provide a building block type distribution system by which many different types of systems can be easily and readily assembled from a few basic components.

The present invention is directed to a coupling assembly including a distribution block or multiple connector block provided with a plurality of intersecting smooth bores extending thereinto from the sides thereof providing a plurality of interconnected ports and a like number of slots, each slot extending between one of the ends of the block and intersecting one of the bores adjacent one of the ports. A fitting termination is provided for each of the ports and includes a cylindrical surface portion having a pair of annular grooves and slidably received within the bore and a shoulder portion abutting a block side surface when the termination is positioned within the associated bore with the outermost annular groove aligned with an associated slot. A seal is provided between the distribution block and the fitting termination by a resilient O-ring positioned within the other groove and a clip sliding within the slot and at least a portion of the outermost groove.

A coupling assembly with the desired fitting members in the desired configuration is assembled by selecting a distribution block, selecting the desired number of fitting terminations with the desired conduit coupling provided thereon, sliding each fitting termination into the appropriate port of the distribution block and inserting a separate clip into each block slot and matching termination groove to lock each fitting termination in place in the block, with the termination and block sealed together by the O-ring.

The coupling assembly system of the present invention meets the needs for a variety of coupling assemblies and at the same time avoids the necessity for a large inventory. With a small stock of coupling blocks and terminations a tremendous number of coupling assembly combinations can be produced. For example, with a basic kit that has an inventory of 90 parts more than 48,000 different coupling assembly combinations can be produced; with only 168 parts more than 600,000 coupling assembly combinations can be produced; and with just 500 parts more than 100,000,000 possible coupling assembly combinations can be produced.

Another feature and advantage of the present invention is the time and ease with which the coupling assembly can be produced. For example, with a distribution block having two intersecting bores passing entirely through the block in the form of a cross having desired terminations at the four ports of the block can be assembled in twenty seconds or less.

Still another feature and advantage of the present invention lies in the fact that no threads are involved in putting the coupling assembly together. This means that the separate parts which ultimately form the coupling assembly need not be rotated but can simply be slidably engaged and there is no possibility of crossing threads that could damage one or more of the parts of the coupling assembly.

Since no rotation is required in assembling each of the coupling assemblies in accordance with the present invention many coupling assemblies can be arranged together in a closely packed array without the otherwise required clearance for rotating the member and/or the tool used to produce the rotational force. This construction permits the partial or preassembly of a system by connecting the fitting terminations to the conduits of the system, laying the system out in the proposed pattern with the appropriate distribution blocks in desired locations to make certain all parts of the system are present, and then quickly and easily finally assembling the system by sliding and clipping the terminations and blocks together. This technique is especially useful where an interior member such as, for example, an electric conductor is contained within a conduit system. In such a situation the parts for the system can be laid out in an array and the conductor threaded through each of the successive parts of the system and the final array snapped together one part at a time.

By providing the fitting termination onto or as an integral part of a conduit at a factory, the completion of the coupling assembly and the system at the job site can be facilitated.

A coupling assembly constructed in accordance with the present invention can not only be rapidly connected or assembled but equally as rapidly disassembled and reused without using special jigs and/or tools.

In a specific embodiment of the present invention the distribution block has a plurality of sides each intersecting the two parallel ends at right angles. The axes of the bores lie in planes parallel to the ends and the slots in the form of a T are perpendicular to the bore axes and the ends. This construction provides an easily manufactured block which can be compactly mounted in a system with other similar blocks and wherein the clips can all be inserted into and removed from the block at one end thereof.

Additionally, this slot construction guides the clip and prevents rotation if the clip around the axis of the fitting termination as the clip is forced into locking position.

Other objects, features and advantages of the present invention will become apparent upon reading the following specification and referring to the accompanying drawings in which similar characteristics of reference represent corresponding parts in each of the several views.

In the drawings:

FIG. 1 is an exploded perspective view of a portion of a coupling assembly in accordance with this invention;

FIG. 2 is a sectional view taken along line 2—2 of FIG. 1 after all parts of the assembly have been connected together including additional terminations not shown in FIG. 1;

FIG. 3 is a perspective view of an alternative construction for the clip illustrated in FIGS. 1 and 2; and FIG. 4 is a sectional view of the structure shown in FIG. 2 taken along line 4—4.

Briefly, the invention relates to a coupling assembly for coupling fluids into and out of a multiple-coupling or distribution box or block. The distribution block contains at least a plurality of intersecting smooth bores providing at least one inlet port and at least one outlet port. In the embodiment shown in the accompanying drawing, four ports are provided in the distribution block, any one or more of which can serve as an inlet port and the remaining ports can serve as outlet ports.

A connector fitting termination is provided which is associated with at least one of the ports, and preferably, a fitting termination is used for each port of the distribution block to which an inlet or outlet conduit is to be connected. Sealing means are located about each connector termination for preventing the escape of fluid from within the block.

The sealing means utilized comprises a groove located in the connector and a resilient O-ring suitably positioned in the groove. A removable retaining means associated with the fitting and the block is provided for securing the fitting to the block. The removable retaining means comprise a retainer clip, preferably, bifurcated and adaptable for insertion in both a groove located in the connector and a groove located in the distribution block port.

In addition, an improved distribution block is described which is usually metallic, but may also be made of a plastic material and which includes a plurality of sides and two parallel ends intersecting the sides. In the distribution block a plurality of intersecting bores with their axes in a common plane parallel to the ends provide the requisite number of ports. A T-shaped slot is associated with each of the plurality of ports of the distribution block. The stem portion of each of the T-shaped slots extends away from the center of the block and the flanged portion of each of the T-shaped slots extends transversely across its associated bore between the two ends of the block.

A fitting termination provided for use with each port of the improved distribution block of this invention includes a cylindrical surface dimensioned to fit within any one of the ports of the distribution block and a pair of axially spaced grooves in the surface. One of the grooves is adapted to contain a sealing member while the other is adapted to be engaged by a retaining clip. The fitting termination also has a flange portion which has a diameter or width greater than the diameter or width of the one end portion of the connector. The flange portion can be provided with a tool engagement means or wrenching surface for permitting the connector to be held against rotation and coupling means can be located on the other end portion of the connector for connecting the connector to any desired conduit.

Referring to the figures, numeral 10 generally designates the coupling assembly of this invention. Coupling assembly 10 is comprised of a distribution block 12, made of a metallic or plastic material and a plurality of connector fittings or fitting terminations 14, one of which is illustrated in FIG. 1 and four of which are illustrated in FIG. 2. The block includes a plurality of sides extending between parallel ends.

Distribution block 12 is preferably made by extruding a long bar having the desired cross section to produce the desired number of sides and is then cut into sections to provide the general block configuration shown in FIGS. 1 and 2. Simple machining operations provide the smooth intersecting bores 18 in distribution block 12 and the slots may be formed as part of the extruded form or else may be broached.

Distribution block 12 contains a plurality of ports 16, each of which communicates with one of the intersecting bores 18. Bores 18 are smooth and devoid of threads, grooves and the like. Distribution block 12 of FIGS. 1 and 2 is shown to contain four ports 16 and two bores 18 associated therewith.

It should be evident that any desired number of ports and intersecting bores can be provided and excess ports can be closed with solid dummy fillings. If five ports are desired, block 12 may be selected of pentagonal cross section and each outer surface may be fitted with a port.

Each of ports 16 contains a T-shaped slot having a stem portion 19 and a flanged portion 20 with the stem portion 19 and the T-shaped slot extending away from the center of distribution block 12. Flanged portion 20 of the T-shaped slot extends transversely across its associated bore 18 between the ends of the block. A pair of unported parallel end faces 21a and 21b form the remaining two sides of the six sided distribution block 12. In the embodiment illustrated, block 12 is provided with a pair of mounting holes 50 and 51 which may receive mounting screws (not shown) for bolting block 12 to a supporting surface or to another block.

As shown in FIGS. 1, 2 and 4, the stem portion 19 of the T-shaped slot has a width less than the diameter of the bore 18 so that the stem portion 19 of the T-shaped slot is enlarged by an arcuate portion on opposite sides thereof where the stem portion 19 of the slot intersects the bore. The length of the top of flanged portion 20 of the T-shaped slot is greater than the diameter of the bore.

Fitting termination 14 has an end portion 22, which is identical for all fittings, for sealingly engaging block 12. More particularly, end portion 22 is generally of cylindrical configuration having a pair of axially spaced inner and outer grooves 24 and 26, respectively. Inner groove 24 is dimensioned to accommodate a resilient seal means such as an O-ring 28, shown separated from the fitting in FIG. 1. O-ring 28 can be made of any suitable resilient material such as rubber or a synthetic material that is resistant to the corrosion of the fluid or gas being circulated in coupling assembly 10.

A bifurcated retainer clip 30 is provided with a generally U-shaped cutout 43 whose facing sides 44 and 45 engage groove 26 of the fitting termination 14, and whose outer sides 46 and 47 engage flange portion 20 of the T-shaped slots associated with each of bores 18. Retainer clip 30 has an outside width to slidingly engage the T-shaped slot and is typically 0.030 inch thick. Facing sides 44 and 45 may be slightly tapered to form a throat or narrow entrance portion so that jarring or vibrating the block will cause the clip to move into rather than out of the block. With the stem portion of the T-shaped slot enlarged on opposite sides thereof by an arcuate portion where the slot intersects the bore forces tending to force the fitting termination 14 out of the bore place the clip in shear all along that arcuate portion.

A suitable communicating bore 32 is provided in connector fitting 14 permitting fluids to pass either into or out of distribution block 12 depending upon whether fitting 14 is to be used as an inlet or outlet. The other end of fitting 14, generally indicated as 34, may be of any desired coupling termination for connection to a utilization means. For example, end portion 34 may be threaded as shown at 34' or may include male or female pipe fittings as well as flared, ferruled or serrated tubing fittings and the like allowing connection to associated inlet and outlet conduits.

By way of example, the assembled coupling 10 in FIG. 2 in the form of a cross includes besides the threaded and flared male fitting termination 14 (shown in FIGS. 1 and 2) a threaded female pipe connection 14' and two male pipe connections 14" and 14''' with different pitch threads. Any of the fitting terminations 14, 14', 14" and 14''' can be interchanged to change the relationship of the fitting terminations on the block 12 and any one of a vast number of other fitting terminations differing in general construction or size of the end remote from end 22 can be substituted. Also, a T can be formed by substituting a plugged termination for any one of the fitting terminations 14, 14', 14" and 14''' and an L can be formed by substituting two plugged terminations for two of the circumferentially adjacent terminations 14, 14', 14" and 14'''. Another assembled coupling 10', similar to assembled coupling 10, is connected via a fitting termination 14 to the assembled coupling 10.

Ftting termination 14 includes a flange portion 36 which may be an integral part thereof, or a separate element suitably fastened thereto. The peripheral surface of flange portion 36 is shaped to provide a tool engagement means such as a hexagonal wrenching surface which permits engagement wtih a suitable wrench or other gripping device. In this manner, fitting 14 can be held against rotation when a threaded conduit is connected thereto or may be rotated if the associated piping is non-rotatable.

Slots 20 of distribution block 12 and groove 26 of fitting termination 14 cooperate with the retainer clip 30 to permit rotation of the connector 14 within bore 16 of the block 12. Since the width of retainer clip 30 in this embodiment is thin some care is required to prevent its distortion to insure its ready insertion and removal. In the preferred embodiment of this invention, flange 36 is provided with a shoulder 36' which engages block 12 when groove 26 is in alignment with flange portion 20 of the T-shaped slot.

When a particular coupling assembly configuration is desired a distribution block 12 is selected with the desired number of bores. Next, fitting terminations with the mounted O-ring 28 and desired coupling construction on the ends remote from end 22 for connection to the particular conduit system are selected from inventory. Each fitting termination is urged into the desired port until the end face 36' of flange portion 36 engages the surface of distribution block 12. In this position, groove 26 of the conductor 14 is aligned with flanged portion 20 of the T-shaped slot located in port 16 and retainer clip 30 can be inserted rapidly into the groove 26 and slot 20 associated with fitting 14 and distribution block 12, respectively. O-ring 28 is compressed during insertion between slot 24 and bore 18 to form a seal preventing the escape of fluid from around fitting 14 within bore 18.

When all of the fitting terminations are provide in the distribution block in desired sequence circumferentially thereof the appropriate coupling assembly is complete. It will be appreciated that a multitude of coupling assemblies having different effective configurations can be produced from a smaller inventory of parts, including a number of different types of fitting terminations 14 and distribution blocks 12. While all of the fitting terminations 14, 14', 14", 14''' as shown in FIG. 2 have their axes in a common plane, it will be appreciated that by the use of two distribution blocks 12 closely coupled together via fitting terminations 14 and with either a straight or curved intermediate tubular portion a coupling assembly can be provided for connecting conduits directed to the location of the coupling assembly from many different angles.

Besides the ability to form a coupling assembly with a building block type system, the coupling assembly in accordance with the present invention has many features and advantages, some of which have been listed above. Thus, the coupling assembly is more readily connectable to associated conduit in a closely packed distribution system since the fitting terminations can easily be slidably inserted into the distribution block without the necessity for rotation of the block 12 or termination 14 or a tool such as, for example, a wrench. The fact that the fitting termination is rotatable within the block 12 permits relative rotation between these elements to accomplish a necessary rotation between two other elements in the overall ssytem, one of which is connected to the fitting termination 14. In this manner, the coupling assembly also serves as a union, and permits easy removal of elements of the system.

Removal of fitting 14 from distribution block 12 can be rapidly achieved by merely withdrawing retainer clip 30 and thereafter withdrawing fitting 14. In this manner, quick connect and disconnect between fitting 14 and distribution block 12 is achieved.

Referring now to FIG. 3 there is shown an alternate embodiment of retainer clip 30 which is generally designated by numeral 31′ and in which corresponding parts are indicated by primes. Retainer clip 30′, instead of having plain facing sides 44 and 45, is provided with retainer indentations or cutouts 48 and 49 in facing sides 44′ and 45′ for engaging the cylindrical bottom surface of groove 26. Cut-outs 48 and 49 are shaped and positioned to generally conform to the engaged bottom surface of groove 26. Cut-outs 48 and 49 releasably lock clip 30 in place thereby retaining fitting 14 securely in block 12. Since insertion of clip 30′ requires a certain amount of spreading of the clip leg portions, the overall width of clip 30′ must be less than the separation between opposed end faces of flange portions 20 of the T-shaped slots. In other words, clip 30′ is narrower than clip 30 to allow spreading prior to the engagement of cut-outs 48 and 49 with the bottom surface of groove 26. This clip embodiment is particularly useful in instances where the distribution block is subject to vibration and prevents the clip from falling out.

To facilitate spreading, connecting portion 52 of clip 30′ is bent so that the plane containing the connecting portion makes an angle "A" with the plane containing the leg portion. The greater angle "A," the less force is required to spread the clip legs during insertion into or removal from the T-shaped slot of block 12. Even though angle "A" may vary anywhere between 0 and 90°, it has been found that an angle from 30 to 60° is usually sufficient to facilitate the spreading of the clip legs. Should it become desirable to increase the force necessary for spreading, angle "A" is decreased until the necessary spreading force equals the described spreading force.

The fluid coupling assembly of this invention may also be utilized as a fluid control system in which case a fluid control element or a fluid control actuating element, provided with a pair of slots and a flange just like fitting termination 14, is releasably connected into one of the ports of the distribution block.

Used in this manner two distribution block ports are respectively provided with suitable fittings for connection to an inlet and an outlet conduit. The interior of the block is shaped so that a valve element, movable between a closed and an open position, can close and open communication between the two ports. The actuating element for the fluid control, which may or may not include the valve element is then inserted in a third port in the same way a fitting is inserted. In this manner, the actuation element can be readily removed for cleaning or for exchange if this becomes desirable.

It should be evident to those skilled in the art that many variations can be made of this invention wherein slots having either a greater width or any other desired configuration can be used and if desired, multiple slots and retainer clips can be used. Further, the number of ports may be varied and the configuration may assume that of a T, Y or the like to provide a desired number of ports in a desired arrangement.

Since many embodiments and variations may be made of this invention, it is not intended to limit the scope of this invention to the specific descripton above, but only by the claims following hereinafter.

What is claimed:

1. A coupling assembly for providing a multitude of possible fitting configurations, sizes and mating characteristics by selection of certain parts comprising: a distribution block having a plurality of sides and two parallel ends intersecting said sides, said distribution block having a plurality of intersecting smooth bores therein providing a plurality of interconnected ports in said sides, said block having a plurality of T-shaped slots each associated with a said port, each of said slots having a portion forming the top of the T extending between said ends and symmetrically intersecting one of said bores and a portion forming the stem of said T extending away from the center of said block; a fitting termination provided for each of said bores for defining the desired coupling configuration, one end of each of said fitting terminations having a cylindrical surface slidably receivable within its associated bore, said cylindrical surface having a pair of annular grooves spaced axially thereof, each of said fitting terminations having a shoulder portion which abuts a side surface of said block when said one end is positioned within said bore and the outermost annular groove is aligned with the associated slot, a resilient O-ring located in the innermost of said grooves and dimensioned to produce sliding sealing contact with the surface of said bore; and a removable flat bifurcated retaining clip slidable within said slot and in at least a portion of said outermost groove for locking the fitting termination in place in said bore.

2. A distribution block for coupling assembly for providing a multitude of possible fitting configurations, sizes and mating characteristics by selection of certain parts comprising: a distribution block having a plurality of sides and two parallel ends intersecting said sides, said distribution block having at least one smooth bore therein providing a plurality of interconnected ports in said sides, said block having a plurality of T-shaped slots each associated with a port; each of said slots having a portion forming the top of the T extending between the ends of said block and symmetrically intersecting one of said bores and the portion forming the stem of said T extending away from the center of said block; the portion forming the top of the T having a length greater than the diameter of said associated bore and the portion forming the stem of the T having a width less than the diameter of said associated bore whereby the stem portion of the T-shaped slot is enlarged on opposite sides thereof by an arcuate portion where said slot intersects said associated bore; a fitting termination provided for each of said bores for defining the desired coupling configuration, one end of each of said fitting terminations having a cylindrical surface slidably receivable within its associated bore, said cylindrical surface having a pair of annular grooves spaced axially thereof, each of said fitting terminations having a shoulder portion which abuts a side surface of said block when said one end is positioned within said bore and the one outermost annular groove is aligned with the associated slot, a resilient O-ring located in the other of said grooves and dimensioned to produce sliding sealing contact with the surface of said bore; and a removable flat bifurcated retaining clip slidable within the top portion of said slot and in at least a portion of said one groove for locking said fitting termination in place in said bore, with the retaining clip in shear along said arcuate body portion.

3. A building block type coupling assembly system formed from a multitude of possible fitting configurations, sizes and mating characteristics by selection of certain parts comprising: a plurality of distribution blocks assembled together to form a system and each having a plurality of smooth intersecting bores of uniform size therein providing a plurality of interconnected ports; a plurality of fitting terminations each constructed to be slidably and sealably inserted in any one of said ports and provided with a cylindrical surface on one end thereof having a pair of annular grooves spaced axially thereof, a shoulder portion adjacent said cylindrical surface, and a resilient O-ring located endmost of said grooves; and a plurality of clips each for locking a termination in one of said ports; each of said distribution blocks having a plurality of sides, two parallel ends intersecting said sides, and a plurality of T-shaped slots each associated with a port and extending between said ends and symmetrically intersecting one of said bores, each of said slots having a portion forming the top of the T extending between the ends of said block and constructed to slidably receive one of said clips and the stem of said T extending away from said block, each said slot constructed such that when one of said fitting terminations is inserted within the associated bore with said shoulder portion thereof abutting one of said sides, the other of said grooves is aligned with the top portion of said T-shaped slot to receive said clip whereby the various fitting terminations can be slidably inserted in the appropriate portions of the appropriate distribution block and locked therein with said clip to provide a coupling assembly of desired characteristics, at least a pair of said fitting terminations connected to different blocks and connected together.

4. The coupling assembly of claim 1 wherein the portion forming the top of the T has a length greater than the diameter of said associated bore and said portion forming the stem of the T has a width less than the diameter of said associated bore whereby the stem portion of the T-shaped slot is enlarged on opposite sides thereof by an arcuate portion where said slot intersects said bore.

5. The coupling assembly of claim 3 wherein the portion forming the top of the T has a length greater than the diameter of said associated bore and said portion forming the stem of the T has a width less than the diameter of said associated bore whereby the stem portion of the T-shaped slot is enlarged on opposite sides thereof by an arcuate portion where said slot intersects said bore.

6. In a detachable coupling assembly for connection to a fitting termination having a cylindrical surface adjacent one end thereof with a pair of axially spaced apart annular grooves located between the end and a shoulder stop portion and with a resilient O-ring located in the one end most of said grooves, the improvement comprising a body member having a port in one surface thereof and a smooth cylindrical bore associated with said port constructed to slidably receive the cylindrical surface of the fitting termination, said body member having a T-shaped slot associated with said port symmetrically intersecting said bore, said slot having a stem portion of the T extending away from said body member parallel with the axis of the bore and the flanged portion of the T extending transversely of said bore and symmetrically intersecting said bore, the length of said flanged portion of said T-shaped slot being greater than the diameter of said bore and the width of said stem portion of said slot being less than the diameter of said bore whereby said stem portion of the T-shaped slot is enlarged on opposite sides thereof by an arcuate portion where said slot intersects said bore, and a movable retaining clip cooperatively associated with the flanged portion of said slot and the other of the grooves of the fitting termination when the cylindrical surface of the fitting termination is inserted within said bore for retaining the fitting termination in said bore with the retaining clip in shear along said arcuate body portion.

7. In a detachable coupling assembly in accordance with claim 6 wherein said body member is in the form of a block with said one surface having a port located between two closely spaced ends with the flanged portion of said slot extending between said ends, said retaining clip comprising a bifucated member having a pair of spreadable legs each of which includes an indentation on the interior surface thereof for engaging the cylindrical surface of the bottom of the other groove in said fitting termination, said clip having an overall width less than the length of said flange portion of said slot by an amount at least equal to the sum of the depth of said indentations, said clip including between said spreadable legs a connecting portion positioned at an angle with the plane of the spreadable legs for optimum spreading action.

8. A building block type coupling assembly system for providing a multitude of possible fitting configurations, sizes and mating characteristics by selection of certain parts comprising: a plurality of distribution blocks each having a plurality of smooth intersecting bores of uniform size therein, providing a plurality of interconnected ports; a plurality of fitting terminations each constructed to be slidably and sealably inserted in any one of said ports and provided with a cylindrical surface on one end thereof having a pair of annular grooves spaced axially thereof, a shoulder portion adjacent said cylindrical surface, a resilient O-ring located endmost of said grooves and means for connecting the other end of at least certain of said terminations to a fluid conduit; and a plurality of clips each for locking a termination in one of said ports; each of said distribution blocks having a plurality of sides, two parallel ends intersecting said sides, and a plurality of T-shaped slots each associated with a port and extending between said ends and symmetrically intersecting one of said bores, each of said slots having a portion forming the top of the T extending between the ends of said block and constructed to slidably receive one of said clips and the stem of said T extending away from said block, each said slot constructed such when one of said fitting terminations is inserted within the associated bore with said shoulder portion thereof abutting one of said sides, the other of said grooves is aligned with the top portion of said T-shaped slot to receive said clip whereby the various fitting terminations can be slidably inserted in the appropriate portions of the appropriate distribution block and locked therein with said clip to provide a coupling assembly of desired characteristics.

References Cited

UNITED STATES PATENTS

| | | | |
|---|---|---|---|
| 1,903,819 | 4/1933 | Kocher | 285—62 |
| 2,535,016 | 12/1950 | Launder | 285—305X |
| 3,154,327 | 10/1964 | Rothschild | 285—305X |
| 3,179,443 | 4/1965 | Staffel | 285—137X |

FOREIGN PATENTS

| | | | |
|---|---|---|---|
| 1,221,823 | 1/1960 | France | 285—E. |

DAVID J. WILLIAMOWSKY, Primary Examiner

W. L. SHEDD, Assistant Examiner

285—158, 201, 305